United States Patent [19]

Suzuki

[11] Patent Number: 5,172,370

[45] Date of Patent: Dec. 15, 1992

[54] DISK REPRODUCING APPARATUS EQUIPPED WITH A PICKUP DEVICE CAPABLE OF READING BOTH SIDES OF A DISK

[75] Inventor: Hiroyuki Suzuki, Higashihiroshima, Japan

[73] Assignee: Sharp Kabushiki Kaisha, Osaka, Japan

[21] Appl. No.: 714,695

[22] Filed: Jun. 13, 1991

[30] Foreign Application Priority Data

Sep. 14, 1990 [JP] Japan ................................ 2-244471

[51] Int. Cl.$^5$ ............................................. G11B 21/02
[52] U.S. Cl. ..................................... 369/258; 369/219; 369/250; 369/199
[58] Field of Search ............... 369/195, 199, 215, 219, 369/244, 249, 256, 44.14, 44.15, 44.16, 44.17, 44.18, 44.19, 44.32, 258, 250

[56] References Cited

U.S. PATENT DOCUMENTS

| 4,637,004 | 1/1987 | Araki et al. ...................... 369/44.32 |
| 4,839,881 | 6/1989 | Takahara et al. ................ 369/195 X |
| 5,036,507 | 7/1991 | Yamashita ........................ 369/44.32 |

FOREIGN PATENT DOCUMENTS

| 59-157872 | 9/1984 | Japan . |
| 60-089874 | 5/1985 | Japan . |
| 0120351 | 6/1986 | Japan ................................ 369/44.16 |
| 63-288476 | 11/1988 | Japan . |
| 1-13970 | 9/1989 | Japan . |
| 2-232820 | 9/1990 | Japan . |

Primary Examiner—Stuart S. Levy
Assistant Examiner—Joseph A. Rhoa
Attorney, Agent, or Firm—David G. Conlin; Robert F. O'Connell

[57] ABSTRACT

A disk reproducing device that has two guide rails disposed at both sides of a disk and that reads data recorded on both sides of the disk using a single pickup device (21) by moving the pickup device along the guide rails. Each guide rail is composed of two linear guide shafts connected by an arcuated guide section (15). The arcuated guide section has a diameter smaller than that of the linear guide shafts, joints connecting the guide shafts and the guide section have tapering shapes, and a plurality of turning bearings are disposed on the pickup device. The pickup device can therefore move smoothly. In addition, all guide shafts can be swung substantially equally by swinging only one linear guide shaft thereby permitting a tilt adjustment to be executed by a single motor. The apparatus further has an adjusting member composed of a flat spring, a screw and other parts, to adjust a position of the pickup device relative to the disk.

10 Claims, 10 Drawing Sheets

DISK REPRODUCING APPARATUS EQUIPPED WITH A PICKUP DEVICE CAPABLE OF READING BOTH SIDES OF A DISK

FIELD OF THE INVENTION

The present invention relates to a disk reproducing apparatus capable of reading data recorded on both sides of various disks without turning the disk over and by means of a single pickup device. More specifically, the present invention relates to a disk reproducing apparatus possessing a servo function for controlling tilt and height of the pickup device at each side of the disk.

BACKGROUND OF THE INVENTION

In some conventional disk reproducing apparatuses adapted for records, so-called laser disks, etc., data recorded on both sides of the disk is read by means of a single pickup device by having the pickup device move to both sides of the disk.

With such a disk reproducing apparatus, in the case that the disk employed is warped, the inclination of the pickup device with respect to the disk is preferably adjusted in accordance with the warp direction (tilt adjustment). In addition, the distance separating the pickup device and the disk is preferably adjusted in accordance with the disk warp (height adjustment).

For instance, in concrete terms, a known type of such a disk reproducing apparatus (Japanese Patent Application No. 66886/1989) includes a slide plate supported by a tray and movable in a radial direction of the disk, and a pivoting table pivotally supported by the slide plate and capable of pivoting upward and downward by 180°. In this disk reproducing apparatus, the pickup device is mounted on the pivoting table.

However, such a configuration presents the disadvantage that it requires a large number of parts causing the apparatus itself to have a large size. Also, the inclination angle of the tray whereon the pickup device is mounted, needs to be changed in order to perform the tilt adjustment of the pickup device. Furthermore, although the above publication does not mention this fact, a separate motor as well as a decelerating device have to be installed in order to perform the height adjustment.

In order to perform the tilt adjustment in a disk reproducing apparatus capable of reading both sides of a disk by means of a single pickup device, one might consider installing linear guide shafts at each side of the disk, each guide shaft being supported so as to be capable of swinging. In such a case, fulcrums about which the guide shafts swing are set in optimum positions corresponding to the relation between the warp angle of the disk and the variation in the height position. As a result, the height is set in the operative range of the focus servo of the pickup device upon swinging of the guide shafts during the tilt adjustment. The necessity of a separate height adjustment may therefore be eliminated.

However, when as described above, the guide shafts swing independently at both sides of the disk, the structure of the apparatus, including a driving source enabling the guide shafts to swing, becomes complex. In addition, the size of the apparatus as well as the cost thereof increase.

Also, an inverting device for moving the pickup device from the guide shafts of one side of the disk to the guide shafts of the other side, has to be installed. However the structure of this inverting device is complex. This is due to the fact that the guide shafts positioned at a predetermined inclination angle through the tilt adjustment, have to be, in addition, positioned so as to allow the motion of the pickup device. Moreover, the pickup device can not move to the inverting device if the guide shafts are not adequately positioned.

One might consider disposing fixed guide shafts at each side of the disk and installing a driving source for the tilt and height adjustments housed inside a transfer unit of pickup device. However, such a mechanism is extremely complex.

SUMMARY OF THE INVENTION

An object of the present invention is to provide a disk reproducing apparatus capable of executing a tilt adjustment in accordance with a disk warp by simply swinging guide shafts of one side of a disk through a single swing drive means.

Another object of the present invention is to provide a disk reproducing apparatus capable of reading both sides of a disk by means of a single pickup device, wherein the pickup device smoothly moves along guide rails disposed at each side of the disk.

Still another object of the present invention is to provide a disk reproducing apparatus where positioning of a pickup device with respect to a turn table is performed without causing distortion of guide rails.

Yet another object of the present invention is to provide a disk reproducing apparatus that enables a pickup device to pass smoothly on an inverting pulley without interference.

In order to achieve the aforementioned objects, a disk reproducing apparatus of the present invention that reads data recorded on both sides of a disk by moving a single pickup device to each side of the disk, comprises guide rails respectively disposed at both sides of the disk to enable a motion of the pickup device. The guide rails are respectively disposed at both sides of the disk and guide the pickup device along a radial direction of the disk. Each guide rail is composed of guide shafts capable of selectively swinging in directions for moving close to and away from the disk, and of an arcuated guide section for guiding the pickup device between the guide shafts disposed at each side of the disk. The guide section is designed such that both ends thereof are coupled to disk outer circumference side ends of the guide shafts so that swinging angles of the guide shafts at both sides of the disk are substantially equal. The reproducing apparatus further comprises swing drive means for swinging the guide shafts at one side of the disk, and moving means for moving the pickup device along the guide rails.

According to the above configuration, the guide shafts guiding the pickup device at each side of the disk are mutually connected through the curved guide sections to simultaneously swing by substantially equal angles in one and same direction. Such an arrangement permits to execute a tilt adjustment in accordance with a warp of the disk by swinging the guide shafts disposed at each side of the disk through the use of a single swing drive means for swinging the guide shafts at one side of the disk. As a result, the number of parts may be decreased whereby the size of the apparatus may be reduced. In addition, the need for the implementation of a special driving source for a height adjustment may be eliminated by setting positions of fulcrums about which the guide shafts swing such that, when the guide shafts are swung in accordance with a disk warp, a height interval separating the disk and the pickup device is substantially equal to the height interval initially separating the disk and the pickup prior to the disk warp.

Moreover, the curved guide sections enable the pickup device to move between the guide shafts at each side of the disk. Data recorded on both sides of the disk may therefore be read by means of a single pickup device.

The pickup device is equipped with bearings slidably fitted onto the guide rails and provision is made such that the diameter of the guide sections is smaller than that of the guide shafts. Here, a plurality of bearings are preferably disposed in a moving direction of the pickup device. The bearings are preferably capable of turning with respect to the pickup device. Further, joints respectively connecting the guide shafts to the guide sections are formed in a tapering shape gradually narrowed from the guide shafts toward the guide sections.

With the above configuration, since the diameter of the guide sections is smaller than that of the guide shafts, a small space is created between the bores of the bearings and the guide sections when the pickup device passes on the guide sections, thereby enabling a smooth motion of the pickup device along the curved guide sections. Here, the passage of the pickup device on the guide sections is made even smoother as the bearings turn along the curved portions of the guide sections. Furthermore, the tapering shape of the joints connecting the guide shafts and the guide sections enables the pickup device to smoothly move from the guide shafts toward the guide sections without being caught.

Provision is made such that the guide shafts at each side of the disk are capable of moving in a direction that is orthogonal to the lengthwise direction thereof and parallel to the disk. In addition, the guide shafts and guide sections are connected through a clearance or a flexible material. Such an arrangement enables to adjust the position of the pickup device with respect to a turn table at each side of the disk. In addition, jolts occurring when the guide shafts are moved in a direction orthogonal to the lengthwise direction thereof in order to adjust the position the pickup device, are absorbed by the clearance or the flexible material. This prevents the guide shafts and the guide sections from being twisted.

The aforementioned moving means comprises a rope for towing the pickup device along the guide shafts and the guide sections, and an inverting pulley to which the rope is engaged and whose radius is substantially equal to the radius of curvature of the guide sections. Provision is made such that the center of the inverting pulley is displaced toward the center of the disk with respect to the centers of curvature of the guide sections. Such a configuration permits the pickup device to smoothly pass on the inverting pulley without interference.

For a fuller understanding of the nature and advantages of the invention, reference should be made to the ensuing detailed description taken in conjunction with the accompanying drawings.

BRIEF DESCRIPTION OF THE DRAWINGS

FIG. 1 through FIG. 8 illustrate an embodiment of the present invention.

FIG. 1(a) is a schematic plan view illustrating a disk reproducing apparatus.

FIG. 2 is a schematic front view illustrating the disk reproducing apparatus during a motion of a pickup device.

FIG. 3 is a schematic plan view illustrating a guide rail.

FIG. 4 is an enlarged front view illustrating essential parts of the disk reproducing apparatus.

FIG. 5 is an enlarged cross-sectional view illustrating a guide section and a turning bearing.

FIG. 6(a) is a schematic front view illustrating the turning bearing.

FIG. 6(b) is a view taken along line 6(b)—6(b) of FIG. 6(a).

DETAILED DESCRIPTION OF THE PREFERRED EMBODIMENTS

An embodiment of the present invention will be discussed below with reference to FIGS. 1 to 8.

Figure 1:
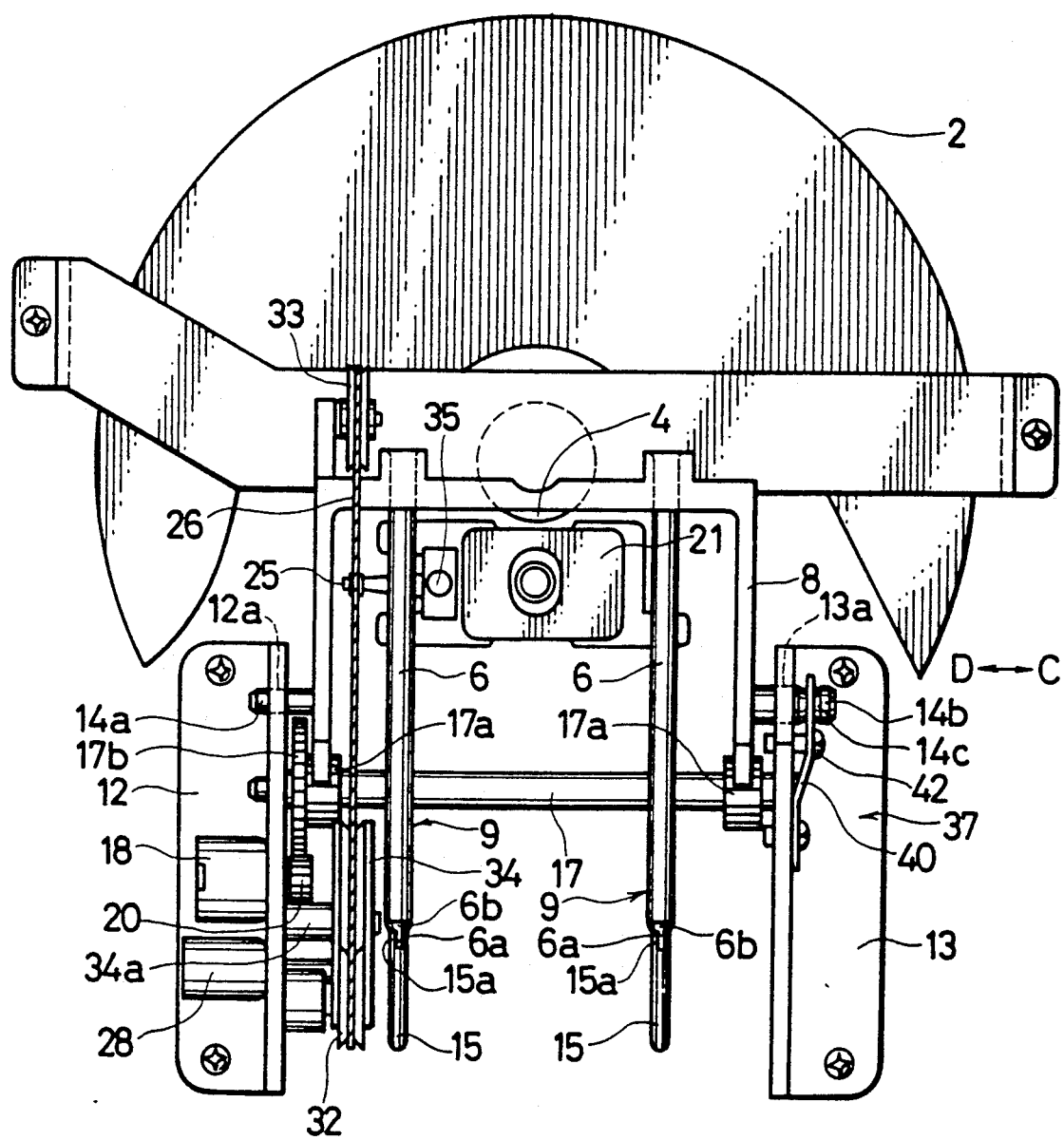
Figure 1B:
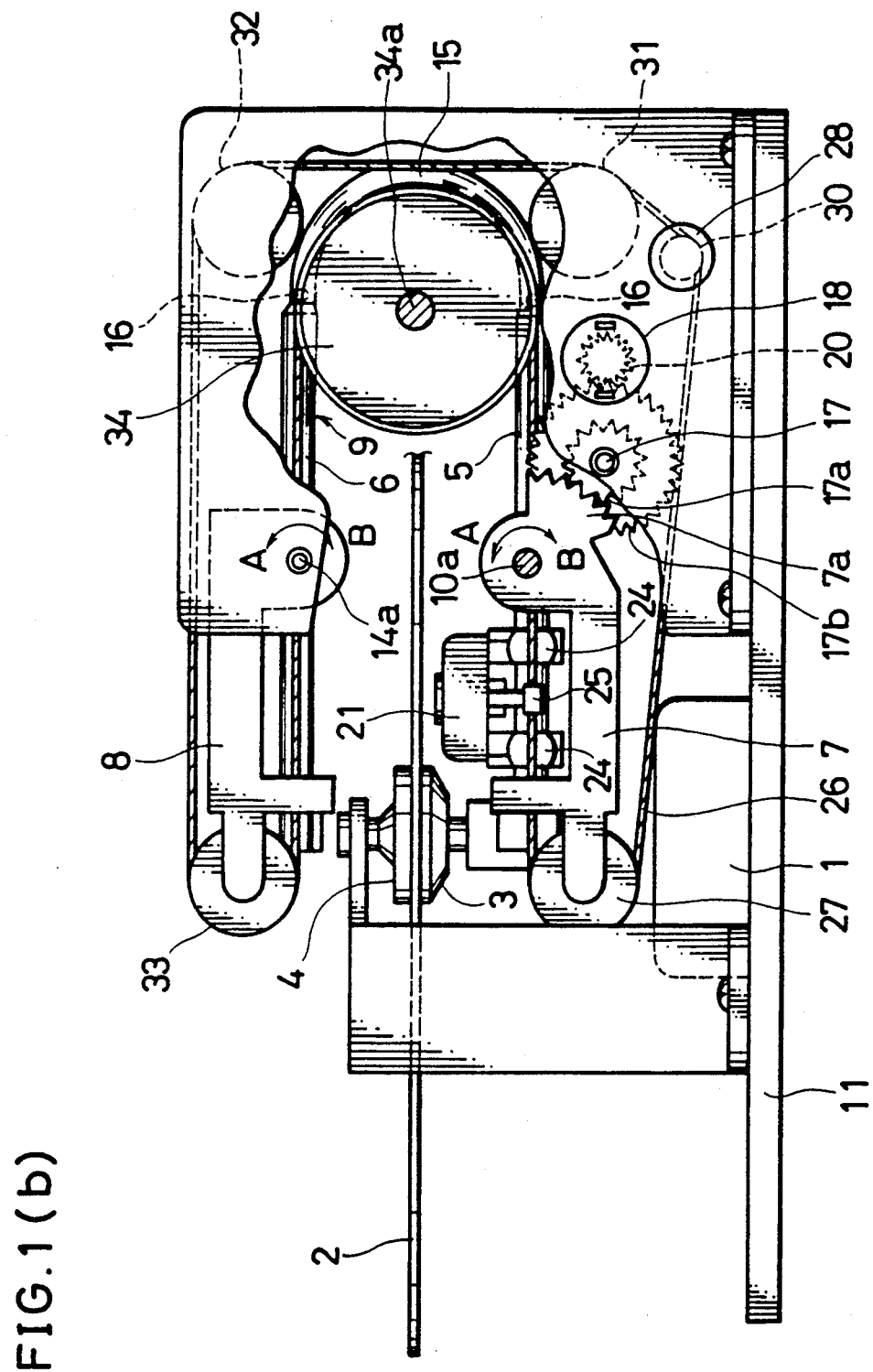
FIG. 1(b) is a schematic front view illustrating the disk reproducing apparatus.
Figure 1C:
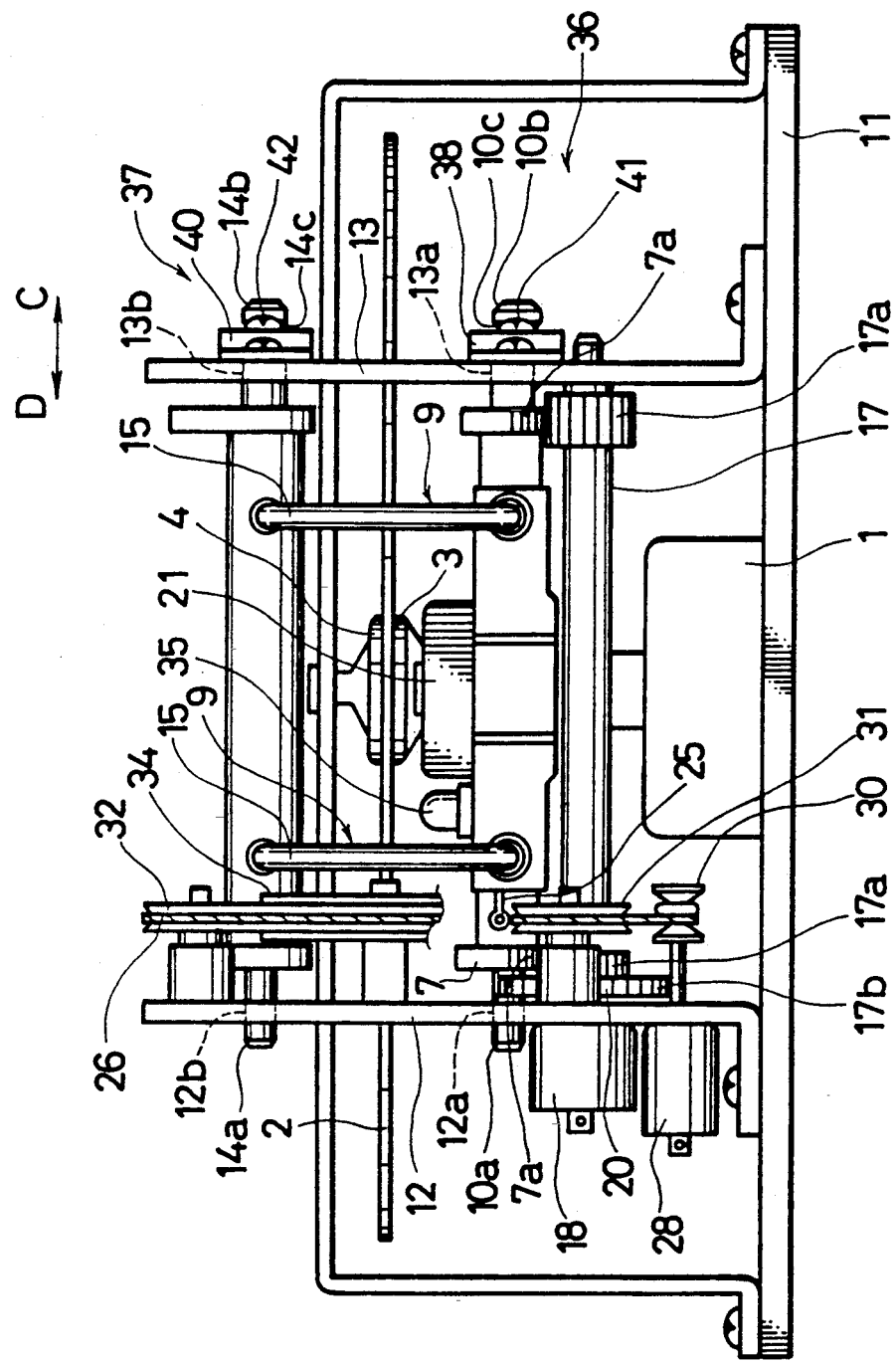
FIG. 1(c) is a schematic side view illustrating the disk reproducing apparatus.

As shown in FIGS. 1(a) to (c), an optical disk reproducing apparatus comprises a turn table 3 and a disk stopper 4. The turn table 3 is coupled with a driving motor 1 capable of driving to rotate in both positive and reverse directions, and an optical disk 2 such as a laser disk or the like is placed thereupon to be rotated. The disk stopper 4 holds down the optical disk 2 on the turn table 3.

Two guide rails 9 are respectively installed at both sides of the optical disk 2 so as to extend in a radial direction of the optical disk 2. Each guide rail 9 is composed of two linear guide shafts 5 and 6 and an arcuated guide section 15 to be described later. Disk inner circumference side ends of the guide shafts 5, are respectively engaged in holes formed in a lower arm 7 (support means), and supported by the lower arm 7. Similarly, disk inner circumference side ends of the guide shafts 6, are respectively engaged in holes formed in an upper arm 8 and supported by the upper arm 8. The lower and upper arms 7 and 8 face each other with the disk 2 between.

The lower arm 7 is capable of selectively pivoting about a pair of fulcrum shafts 10a and 10b in directions A and B. The fulcrum shafts 10a and 10b are parallelly and coaxially disposed, and are respectively supported through holes 12a and 13a formed in a pair of brackets 12 and 13. The brackets 12 and 13 are affixed to a base plate 11.

Similarly, the upper arm 8 is capable of pivoting about a pair of fulcrum shafts 14a and 14b. The fulcrum shafts 14a and 14b are supported through holes 12b and 13b formed in the brackets 12 and 13. The positions of the fulcrum shafts 10a, 10b, 14a and 14b in a radial direction of the optical disk (direction along the guide shaft) are determined so that difference between the distance separating an optical pickup device 21 (to be described later) and the optical disk 2 after the guide shafts 5 and 6 were swung in accordance with a warp of the optical disk 2, and that before the warp occurred, is as small as possible. Accordingly, a tilt adjustment performed by pivoting the guide shafts 5 and 6 also enables a height of the optical pickup device 21 to be adjusted.

Disk outer circumference side ends of the guide shafts 5 and 6 facing each other across the optical disk 2, are located outside the circumference of the optical disk 2 and are connected through the guide sections 15. The guide sections 15 are formed in the shape of an arc of 180°. More precisely, as can be seen in FIG. 1(a), bifurcated portions 15a are respectively formed at both ends of each guide section 15, and thin sections 5a or 6a of the guide shafts 5 or 6 are inserted therein. The bifurcated portions 15a and the thin sections 5a or 6a are pivotally connected through pins 16 (FIG. 1(b)). Provision is made such that the pins 16 are disposed on a vertical line that passes through the center of curvature of the guide section 15, or is slightly displaced toward the center of the optical disk 2 with respect to the vertical line.

The guide sections 15 are designed such that a diameter thereof is slightly smaller than that of the guide shafts 5 and 6. Tapering portions 5b and 6b are respectively formed at the ends of the guide shafts 5 and 6 leading to the thin sections 5a and 6a so that the diameter of the guide shafts 5 and 6 gradually becomes equal to that of the guide sections 15, thereby enabling a smooth transition between the guide shafts 5 and 6 and the guide sections 15.

The lower arm 7 has arcuated gears 7a respectively formed at disk outer circumference side ends thereof. The gears 7a and small gears 17a mounted on a gear shaft 17, are meshed. Both ends of the gear shaft 17 are respectively supported by the brackets 12 and 13. Large gears 17b are disposed on the gear shaft 17 so as to be concentric with the small gears 17a, and mesh with a tilt drive gear 20. The tilt drive gear 20 is mounted on an output shaft of a tilt drive motor 18 adopted as swing drive means. This arrangement enables the lower arm 7 and the guide shafts 5 to selectively pivot about the fulcrum shafts 10a and 10b in the directions A and B upon rotation of the tilt drive motor 18.

Figure 3:
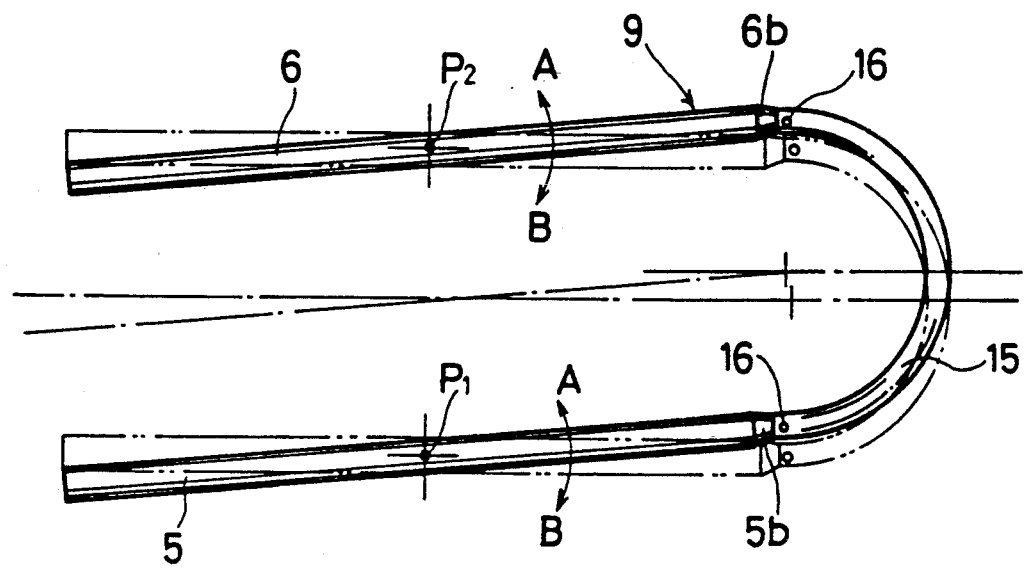

Here, the guide shafts 5 and the guide shafts 6 are respectively pivotally connected through the guide sections 15. Therefore, as shown in FIG. 3, when the guide shafts 5 pivot about the fulcrum shafts 10a and 10b (centers thereof are indicated as P₁) in a direction A or B, the guide shafts 6 pivot about the fulcrum shafts 14a and 14b (centers thereof are indicated as P₂) in the same direction and by a substantially same angle as the guide shafts 5, and the guide shafts 5 and 6 stay in parallel.

Provision is made such that the optical pickup device 21 is capable of moving along the guide rails 9 to both sides of the optical disk 2. Namely, as shown in FIGS. 6(a) and (b), the optical pickup device 21 is equipped with turning bearings 24 respectively composed of a spherical cavity 22 and a substantially spherical rotatable member 23 rotatably fitted into the spherical cavity 22. A bore 23a is formed in the rotatable member 23 and is slidably fitted onto the guide shafts 5 or 6, or the guide sections 15.

A rope 26 (moving means) is secured in a rope securing part 25 protruding on a side of the optical pickup device 21. The rope 26 is engaged in a pulley 27 attached to the lower arm 7 and is further wound so as not to slip, around a pulley 30 affixed to an output shaft of a dispatching motor 28 belonging to the moving means. The rope 26 is further engaged in pulleys 31 and 32 attached to the bracket 12 and in a pulley 33 attached to the upper arm 8. Thereafter, the rope 26 is engaged in an inverting pulley 34 (moving means) mounted on the bracket 12 and capable of rotating, to reach the securing part 25. Here, in the interval along the guide rail 9, the rope 26 is guided so as to be substantially parallel to the guide rail 9.

A tilt sensor 35 is mounted on the optical pickup device 21 to project a light on the optical disk 2 and detect an inclination of the optical disk 2 relative to the optical pickup device 21 based on a reflected light.

Suppose now that, the above arrangements being made, the optical disk 2 whereon data is recorded on both sides, is read starting from the side facing the guide shafts 5 (lower side). As shown in FIG. 1(b), the dispatching motor 28 is driven to move the optical pickup 21 along the guide shafts 5 toward the inner circumference of the optical disk 2.

The optical pickup device 21 is then gradually moved toward the outer circumference of the optical disk 2 along the guide shafts 5 to read data recorded on the optical disk 2.

During reproduction, the inclination of the optical disk 2 is detected through the tilt sensor 35. In the case that the optical disk 2 is inclined due to a warp, the guide shafts 5 together with the lower arm 7 are pivoted by the tilt drive motor 18 about the fulcrum shafts 10a and 10b in the direction A or B to incline the optical pickup device 21 in accordance with the inclination of the optical disk 2. As was mentioned above, when the guide shafts 5 pivot, the guide shafts 6 pivot about the fulcrum shafts 14a and 14b in the same direction and by a substantially same angle as the guide shafts 5. The guide shafts 5 and the guide shafts 6 therefore stay in parallel.

Once the optical pickup device 21 is moved along the guide shafts 5 to the outer circumference of the optical disk 2, it is then moved, if necessary, toward the guide shafts 6 via the guide sections 15.

Figure 4:
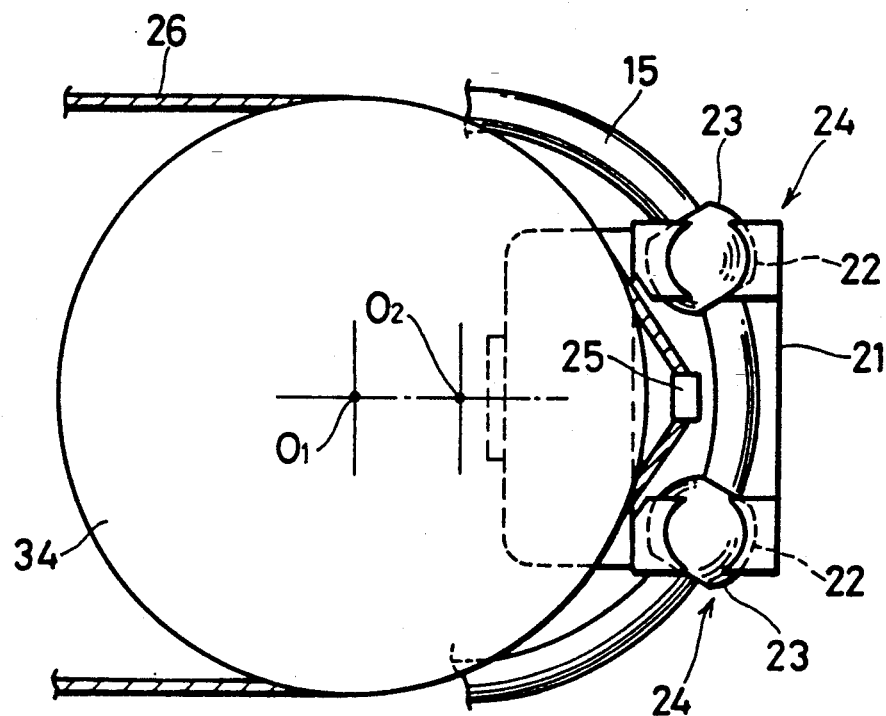
Figure 5:
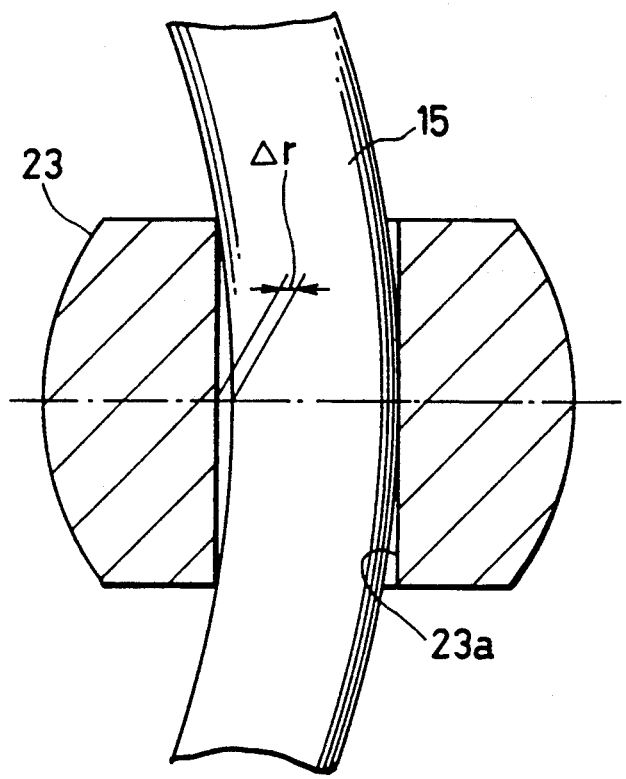
Figure 6:
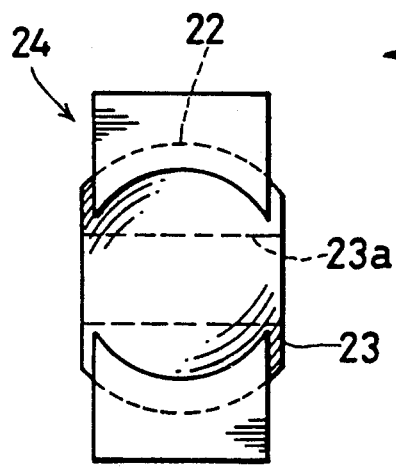
Figure 6:
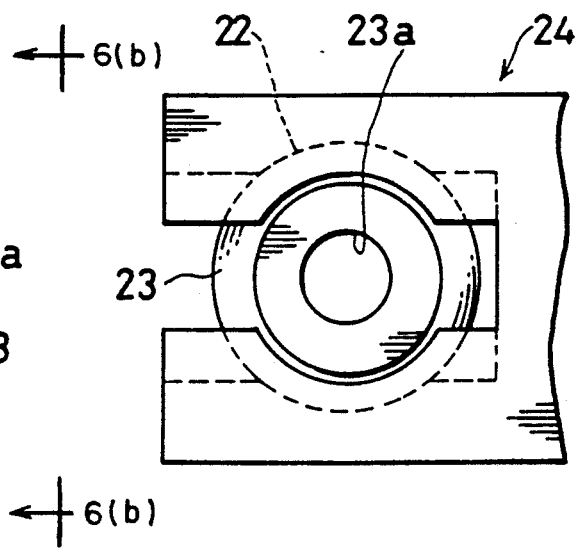
Figure 7A:
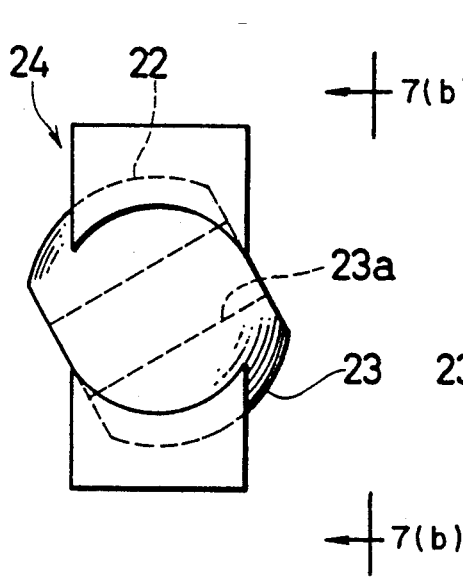
FIG. 7(a) is a schematic front view illustrating the turning bearing passing upon the guide section.
Figure 7B:
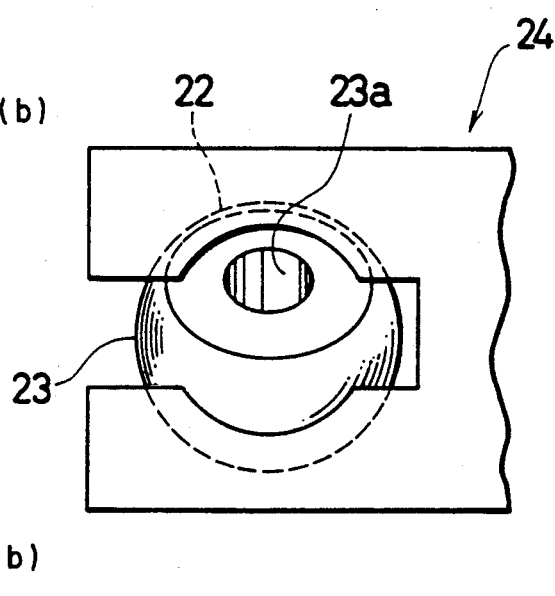
FIG. 7(b) is a view taken along line 7(b)—7(b) of FIG. 7(a).

FIG. 4 illustrates the motion of the optical pickup device 21 along the guide sections 15. As mentioned above, the guide sections 15 are designed such that the diameter thereof is slightly smaller than that of the guide shafts 5 and 6. Namely, as shown in FIG. 5, the diameter of each guide section 15 is smaller than the bore 23a formed in the rotatable member 23 of each turning bearing 24 by $\Delta r$. In addition, as shown in FIGS. 7(a) and (b), the rotatable member 23 rotates in accordance with the curvature of the guide sections 15 thereby enabling a smooth motion of the optical pickup device 21 along the guide sections 15. Also, the size of $\Delta r$ is determined according to the bore diameter of the bore 23a and the radius of curvature of the guide sections 15.

As shown in FIG. 4, a center $O_1$ of a support shaft 34a of the inverting pulley 34 is slightly displaced toward the center of the optical disk 2 with respect to center of curvature $O_2$ of the guide section 15 in order to prevent interference between the rope securing part 25 mounted on the optical pickup device 21 and the inverting pulley 34 when the optical pickup device 21 passes on the guide sections 15.

As discussed above, the tapering portions 5b and 6b are respectively formed on the guide shafts 5 and 6 at the joints connecting the guide shafts 5 and the guide section 15, and at the joints connecting the guide section 15 and the guide shafts 6. This configuration enables the optical pickup device 21 to move smoothly without being caught from the guide shafts 5 to the guide sections 15, and from the guide sections 15 to the guide shafts 6.

Figure 2:
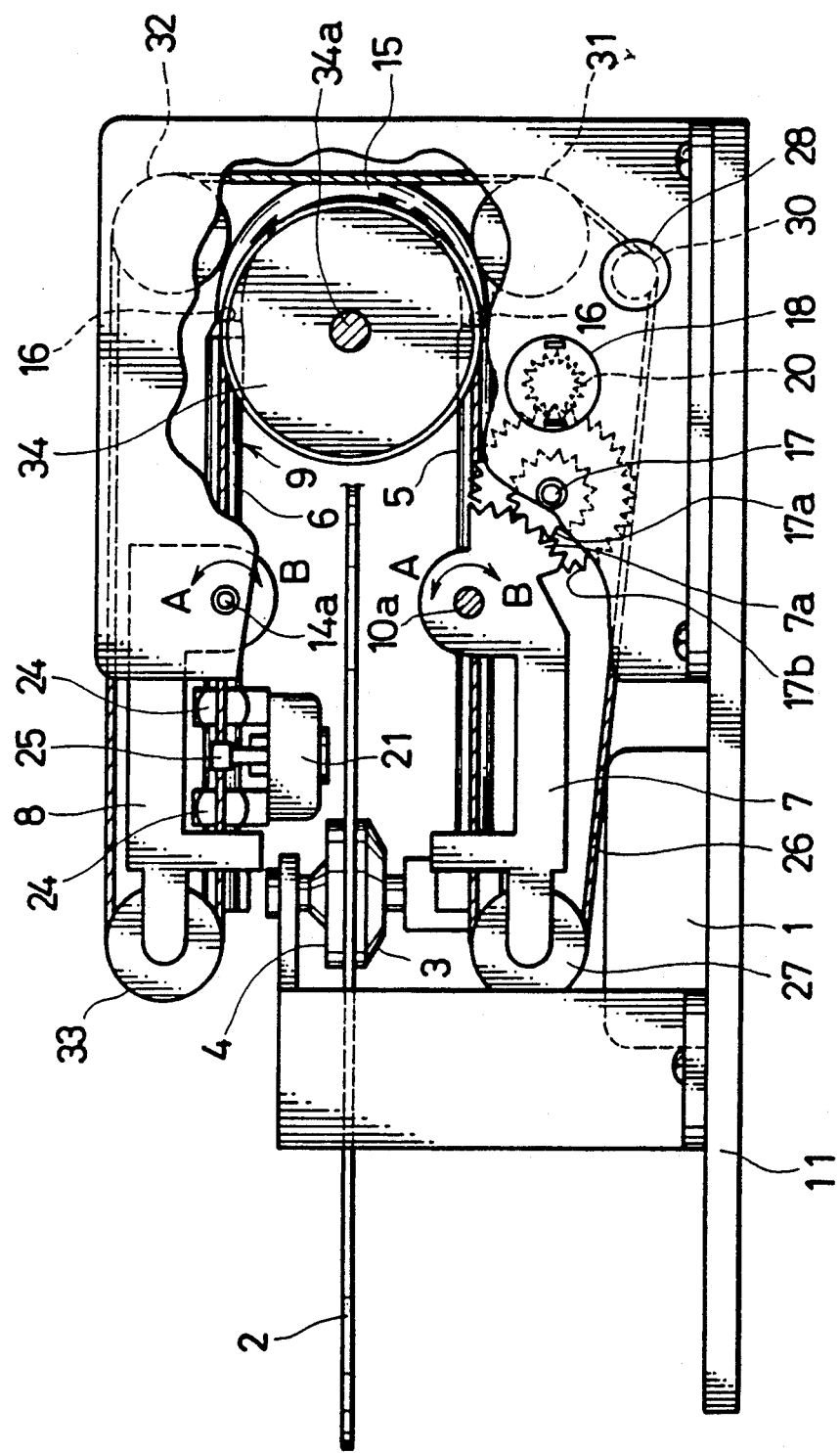

After the optical pickup device 21 passed on the guide sections 15 and reached the guide shafts 6, it is moved along the guide shafts 6 to the inner circumference of the optical disk 2 (see FIG. 2).

The dispatching motor 28 is then reversed, and the optical pickup device 21 is gradually moved along the guide shafts 6 toward the outer circumference of the optical disk 2 to read data recorded on a side of the optical disk 2 facing the guide shafts 6 (upper side). While the data recorded on the upper side is read, the guide shafts 6 may be inclined in an interlocked manner with the guide shafts 5 by means of the tilt drive motor 18 in the case that the optical disk 2 is warped.

Here, if the optical pickup device 21 is to be moved to the guide shafts 5 side, the dispatching motor 28 should be kept reversed so that the optical pickup device 21 passes on the guide sections 15 and reaches the guide shafts 5.

When assembling the optical disk reproducing apparatus, the horizontal position of the optical pickup device 21 relative to the turn table 3 has to be adjusted on the guide shafts 5 side and on the guide shafts 6 side after the pickup device 21 is mounted on the guide rails 9. The reason for this adjustment is as follows.

Namely, in an optical pickup device adopting a so-called three beam method as tracking error detection method, the inclination angle of two sub beams employed for detecting a track error, is set to a suitable constant angle relative to a track direction. Here, in order to maintain the above inclination angle constant at positions on a radial direction at both the inner circumference and the outer circumference of the optical disk 2, the position of the optical pickup device 21 including the guide shafts 5 and 6, has to be precisely adjusted so that, when the optical pickup device 21 is moved in a radial direction, a trace of a light spot forms a straight line passing through the center of the optical disk 2.

As shown in FIGS. 1(a) and (c), in the present embodiment, adjusting devices 36 and 37 are disposed on the bracket 13 to adjust the position of the optical pickup device 21 in an axial direction of the fulcrum shafts 10a, 10b, 14a and 14b so that the trace of the light spot coincides with a straight line passing through the center of the optical disk 2. The adjustment is performed by moving the guide shafts 5 and 6 in parallel with the surface of the optical disk 2 (horizontally) in a direction indicated by the arrow C or D.

One end of a flat spring 38 and one end of a flat spring 40 are respectively affixed to the bracket 13 in the vicinity of the fulcrum shaft 10b and of the fulcrum shaft 14b.

An opening (not shown) is formed at another end of each of the flat springs 38 and 40. The openings of the flat springs 38 and 40 are respectively fitted on annular grooves 10c and 14c formed on the fulcrum shafts 10b and 14b, and the fulcrum shafts 10b and 14b are pressed in the direction C.

The flat springs 38 and 40 are pressed in the direction D by means of adjusting screws 41 and 42 screwed in the bracket 13. The optical pickup device 21 can be selectively moved in the directions C and D by adjusting the outstanding amount of the adjusting screws 41 and 42. The adjustment of the position of the optical pickup device 21 relative to the turn table 3, is separately performed on the guide shafts 5 and on the guide shafts 6.

Figure 8A:
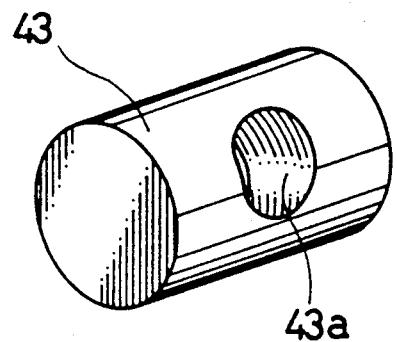
FIG. 8(a) is a perspective view illustrating other bearings of the present invention.
Figure 8B:
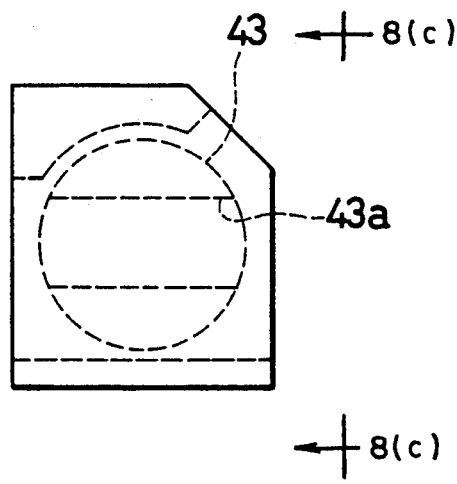
FIG. 8(b) is a schematic front view of FIG. 8(a).
Figure 8C:
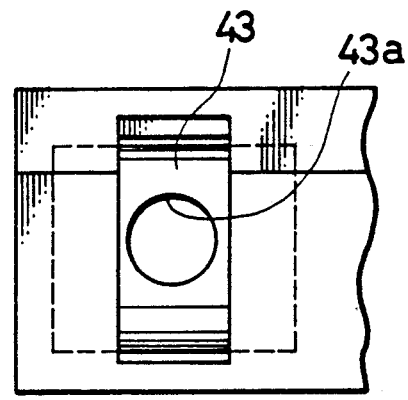
FIG. 8(c) is a view taken along line 8(c)—8(c) of FIG. 8(b).

When embodying the present invention, the turning bearings 24 of the present embodiment may be replaced by bearings 43 and respectively provided with bores 43a and as shown in FIGS. 8(a), (b) and (c).

Figure 9A:
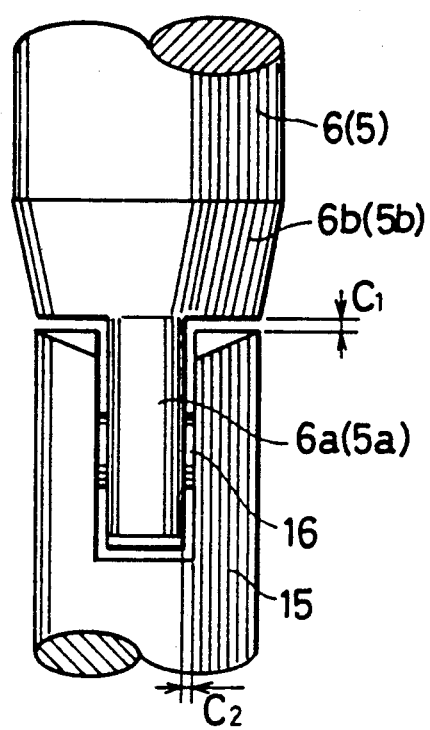
FIG. 9(a) is an enlarged side view illustrating a joint connecting a guide shaft and the guide section.
Figure 9B:
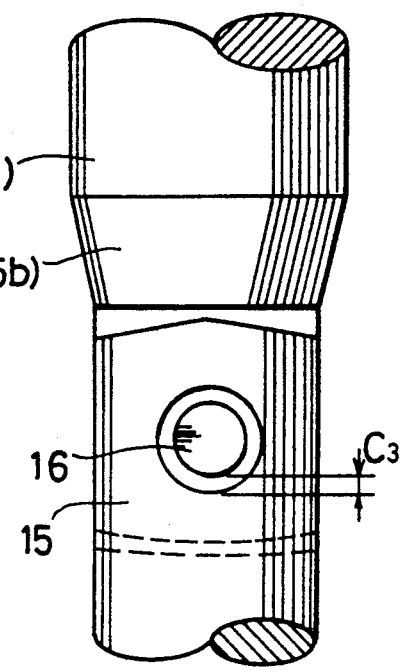
FIG. 9(b) is an enlarged front view illustrating the joint connecting the guide shaft and the guide section.
Figure 10:
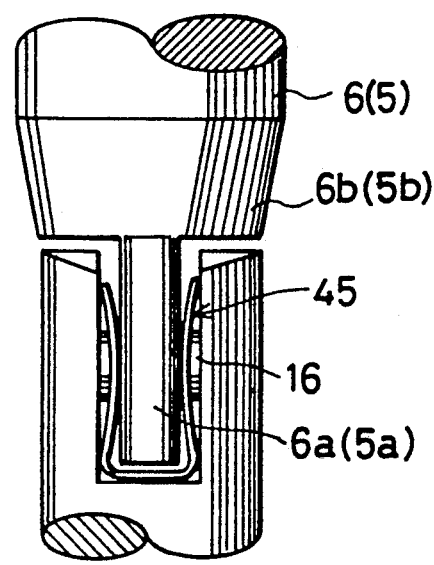
FIG. 10 is an enlarged plan view illustrating another joint of the present invention connecting the guide shaft and the guide section.
Figure 11:
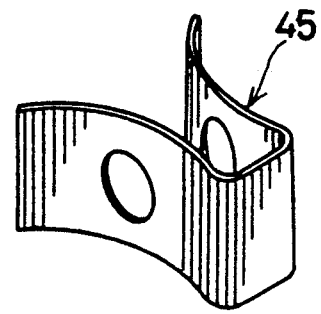
FIG. 11 is a perspective view illustrating a flat spring.
Figure 12:
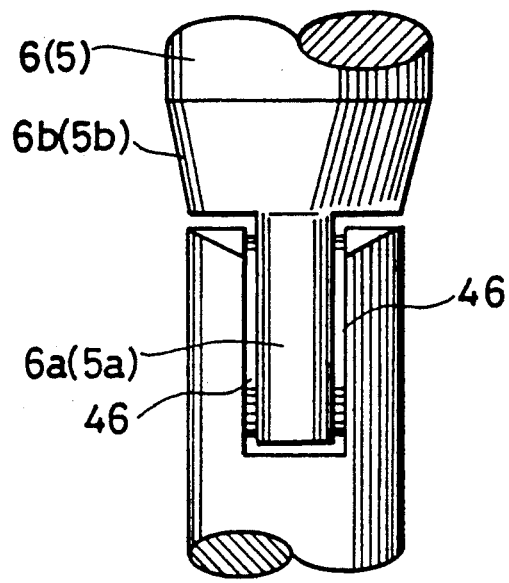
FIG. 12 is an enlarged plan view illustrating still another joint of the present invention connecting the guide shaft and the guide section.
Figure 13:
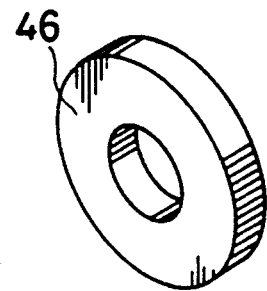
FIG. 13 is a perspective view illustrating a washer.

As shown in FIGS. 9(a) and (b), because of the necessity to slightly move the optical pickup device 21 in the direction C or D in order to adjust the position thereof at the time of assembly, small clearances $C_1$, $C_2$, and $C_3$ are preferably accommodated beforehand in the joints connecting the guide shafts 5 and 6 to the guide sections 15. Alternatively, as shown in FIGS. 10 and 11, the clearances $C_1$ and $C_2$ can be accommodated in the joints and a flat spring 45 adopted as flexible material, be inserted in the clearance $C_2$. Or, as shown in FIGS. 12 and 13, rubber washers 46 may be inserted in the clearance $C_2$.

Figure 14:
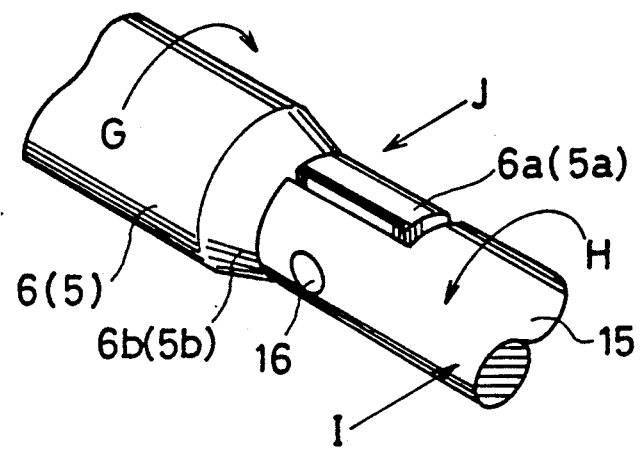
FIG. 14 is a perspective view illustrating forces exerted upon the connecting section of the guide shaft and the guide section.

As a result, as shown in FIG. 14, the formation of the clearances $C_1$ and $C_2$ in the joints and the insertion of flexible materials such as the flat spring 45 or the washers 46, enable to buffer and absorb twisting forces exerted upon the joints in directions indicated by arrows G and H, or bending forces exerted in directions indicated by arrows I and J.

The present embodiment discussed a reproducing apparatus adapted for the optical disk 2. However the present invention may also be applied to reproducing apparatuses for various disks such as records, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disk reproducing apparatus for reading data recorded on both sides of a disk by moving a pickup device to each side of the disk, comprising:
   guide shafts for guiding the pickup device in a radial direction of the disk, said guide shafts being disposed at each side of the disk;
   arcuated guide sections for guiding the pickup device between said guide shafts of each side of the disk, both ends of said guide sections being coupled to disk outer circumference ends of said guide shafts;
   first support means for swinging said guide shafts, said support means being supported by first shafts so as to be capable of swinging, and being coupled to disk inner circumference side ends of said guide shafts located at one side of the disk;
   second support means for swinging said guide shafts, said second support means being supported by second shafts so as to be capable of swinging, and being coupled to disk inner circumference side ends of said guide shafts located at the other side of the disk;

swing drive means for swinging said first support means; and moving means for moving the pickup device along said guide shafts and said guide sections;

wherein said guide shafts are supported by said first support means and said second support means so as to be capable of swinging in directions to move toward and away from the disk; and swing angles of the guide shafts swung by said swing drive means are substantially equal at each side of the disk.

2. The disk reproducing apparatus as defined in claim 1, wherein a diameter of said guide sections is smaller than a diameter of said guide shafts.

3. The disk reproducing apparatus as defined in claim 2, wherein a joint connecting said guide shaft and said guide section includes a tapering portion having a tapering shape gradually narrowed from said guide shaft toward said guide section, said tapering portion being formed at the disk outer circumference side end of said guide shaft.

4. The disk reproducing apparatus as defined in claim 3, wherein said joint further comprises a thin portion formed at an ending of said guide shaft, and a bifurcated portion formed at an ending of said guide section, said thin portion being inserted into said bifurcated portion.

5. The disk reproducing apparatus as defined in claim 4, wherein a clearance is accommodated between said bifurcated portion and said thin portion.

6. The disk reproducing apparatus as defined in claim 5, wherein said joint further includes a flat spring or a washer disposed inside said clearance.

7. The disk reproducing apparatus as defined in claim 1, wherein the pickup device comprises a plurality of bearings capable of turning relative to the pickup device, said bearings being disposed along a moving direction of the pickup device, and being slidably engaged to said guide shafts or said guide sections.

8. The disk reproducing apparatus as defined in claim 1 further comprising adjusting means for moving said first support means in a direction orthogonal to a lengthwise direction of said guide shaft and parallel with a surface of the disk, a position of the pickup device relative to the disk being adjusted by said adjusting means.

9. The disk reproducing apparatus as defined in claim 8, wherein said adjusting means comprises:

a shaft being in contact with said support means;

a flat spring, one end of said flat spring being coupled to said shaft, and another end of said flat spring being affixed to the reproducing apparatus; and a screw being screwed to the reproducing apparatus through said flat spring, wherein the position of the pickup device relative to the disk is adjusted by means of said screw.

10. The disk reproducing apparatus of claim 1, wherein said moving means comprises:

a rope for towing the pickup device along said guide shafts and said guide sections; and an inverting pulley to which said rope is engaged, a radius of said inverting pulley being substantially equal to a radius of curvature of said guide sections, wherein said inverting pulley is positioned so that a center of said inverting pulley is displaced toward a center of the disk with respect to a center of curvature of said guide sections.

* * * * *